US007404517B2

(12) United States Patent
Wallerstorfer et al.

(10) Patent No.: US 7,404,517 B2
(45) Date of Patent: Jul. 29, 2008

(54) ACCESS CONTROL SYSTEM

(75) Inventors: Kurt Wallerstorfer, Irrsdorf (AT); Gregor Ponert, Salzburg (AT)

(73) Assignee: SkiData AG, Gartenau (AT)

( * ) Notice: Subject to any disclaimer, the term of this patent is extended or adjusted under 35 U.S.C. 154(b) by 0 days.

(21) Appl. No.: 11/405,681

(22) Filed: Apr. 17, 2006

(65) Prior Publication Data

US 2006/0231615 A1 Oct. 19, 2006

(30) Foreign Application Priority Data

Apr. 18, 2005 (DE) ...................... 10 2005 017 841

(51) Int. Cl.

| | |
|---|---|
| ***G06F 7/04*** | (2006.01) |
| ***G06F 17/00*** | (2006.01) |
| ***G08B 29/00*** | (2006.01) |
| ***G06K 5/00*** | (2006.01) |

(52) U.S. Cl. ...................... 235/382; 235/380; 235/375; 340/5.2

(58) Field of Classification Search ................. 235/380, 235/382, 382.5, 379, 385, 451, 492, 375; 340/5.2, 5.26; 705/1; 702/187; 324/76.11; 455/573

See application file for complete search history.

(56) References Cited

U.S. PATENT DOCUMENTS

| | | | | |
|---|---|---|---|---|
| 3,221,304 | A * | 11/1965 | Enikeieff et al. | 340/5.26 |
| 5,397,884 | A * | 3/1995 | Saliga | 235/382.5 |
| 5,831,547 | A * | 11/1998 | Ohtsuki et al. | 235/384 |
| 5,844,244 | A * | 12/1998 | Graf et al. | 235/375 |
| 6,168,083 | B1 * | 1/2001 | Berger et al. | 235/492 |
| 6,179,205 | B1 * | 1/2001 | Sloan | 235/382 |
| 6,772,945 | B2 * | 8/2004 | Mahoney et al. | 235/380 |
| 6,920,431 | B2 * | 7/2005 | Showghi et al. | 705/26 |
| 7,017,808 | B2 * | 3/2006 | Holzer | 235/385 |
| 7,076,441 | B2 * | 7/2006 | Hind et al. | 705/10 |
| 7,240,036 | B1 * | 7/2007 | Mamdani et al. | 705/75 |
| 2002/0107054 | A1 * | 8/2002 | Fujisawa et al. | 455/573 |
| 2003/0163287 | A1 * | 8/2003 | Vock et al. | 702/187 |
| 2005/0044906 | A1 * | 3/2005 | Spielman | 340/5.7 |
| 2005/0242921 | A1 * | 11/2005 | Zimmerman et al. | 340/5.2 |
| 2006/0143036 | A1 * | 6/2006 | Kato | 705/1 |
| 2006/0152208 | A1 * | 7/2006 | Watanabe et al. | 324/76.11 |

FOREIGN PATENT DOCUMENTS

| | | |
|---|---|---|
| AT | 000601 U1 | 4/1993 |
| DE | 103 41 962 A1 | 4/2004 |
| EP | 0621566 A1 | 4/1994 |

* cited by examiner

*Primary Examiner*—Thien M. Le
*Assistant Examiner*—Thien T Mai
(74) *Attorney, Agent, or Firm*—Flynn, Thiel, Boutell & Tanis, P.C.

(57) ABSTRACT

A non-contact-type access authorization reading device on an access control apparatus (1) reads an access authorization stored in a data carrier (9) received by an object (ski 7) which the user carries near the ground. The reading device has an antenna (11) disposed in the ground area and is connected to an evaluation unit which releases the access (2) upon reading of a valid access authorization. To provide the data carrier (9) with an access authorization, a copy-over data carrier (12) is acquired which stores a coding authorization for an access authorization. A copy-over reading device reads the coding authorization on the copy-over data carrier (12), and a coding device contactlessly codes the access authorization on the access authorization data carrier (9), the coding authorization being deleted after coding.

21 Claims, 1 Drawing Sheet

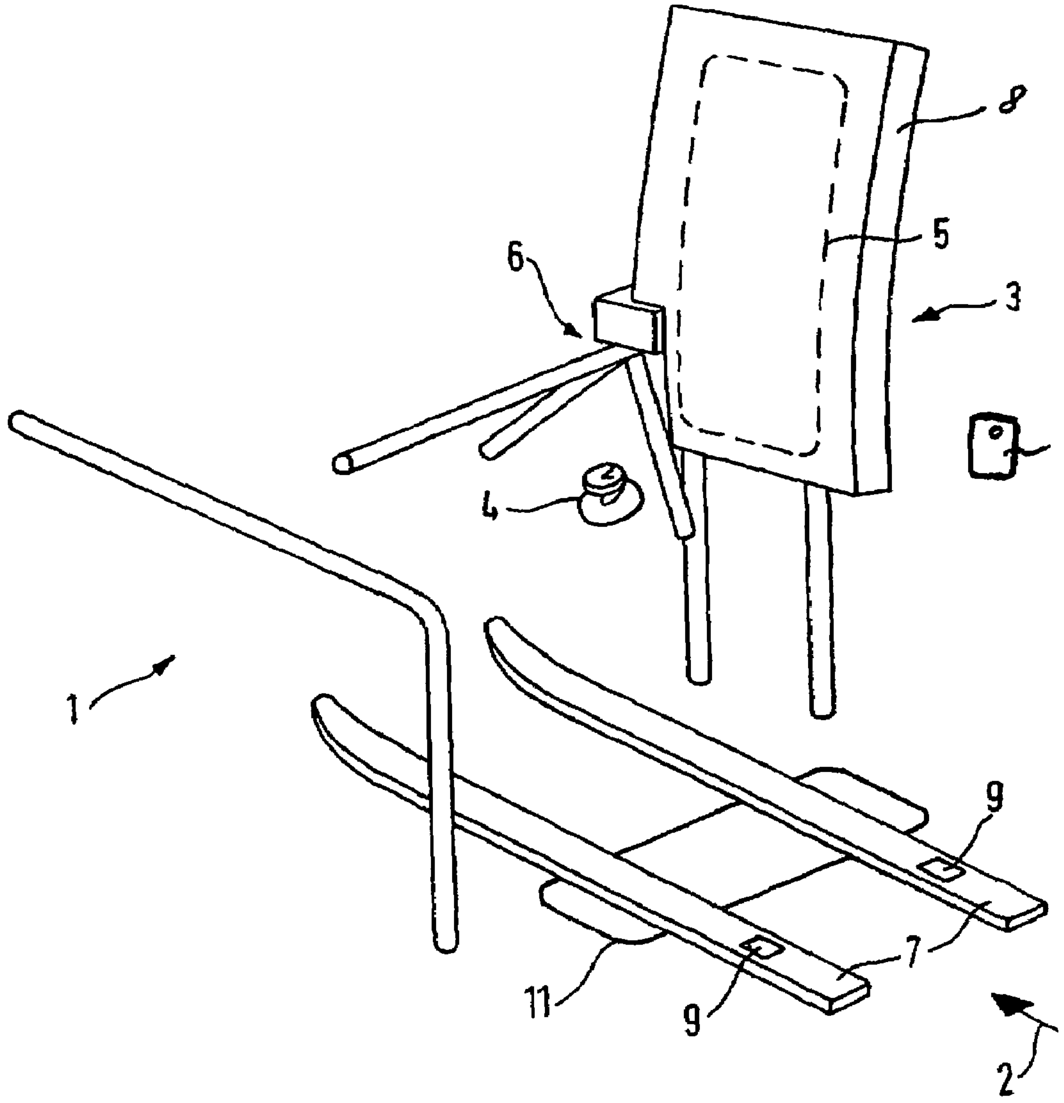
8
5
6
3
12
4
1
9
7
11
9
2

ACCESS CONTROL SYSTEM

This invention relates to a system having an access control apparatus with a non-contact-type access authorization reading device and a portable access authorization data carrier for controlling access of a person to an area, as well as a portable copy-over data carrier for providing an access authorization and a coding authorization.

Such a system is already known (AT 000 601 U1). The access control apparatus is provided at a ski lift, and the data carrier carried by the user near the ground provided in the skier's ski or ski boot.

Upon acquisition of the access authorization, the data carrier must be coded with the access authorization by a coding device e.g. at a ticket office. While it is readily possible to code data carriers that are card-shaped or formed for example as wrist watches by the coding device at a ticket office, coding a data carrier on a ski or ski boot is a problem. The skis might thus have to be unstrapped and at least one ski boot taken off and handed back and forth awkwardly and with considerable time expenditure at the ticket office for coding.

The purpose of the invention is to substantially simplify the coding of data carriers carried near the ground, in particular in a ski or ski boot.

For coding the data carrier in the ski, ski boot or similar object on the user near the ground, the coding device has an antenna disposed in the ground area. For this purpose, the antenna can be embedded in the ground, rest on the ground, or be provided for example on the underside of a mat covering the passageway. The access control apparatus of the inventive system can be any person singling device, for example a rotating barrier, light barrier and the like. The access authorization reading device is connected to an evaluation unit which releases the access upon reading of a valid access authorization, i.e. for example drives the motor, in the case of a rotating barrier driven by a motor, so that the user of the data carrier can pass the rotating barrier.

According to the invention, the data carrier in the ski, ski boot or other object carried by the user near the ground is coded using a copy-over data carrier, which the user is given at the ticket office for example. The copy-over data carrier stores an access authorization together with a coding authorization in order to code an access authorization onto the data carrier in the ski, ski boot or other object.

Coding the data carrier in the ski, ski boot or other object is preferably done during passage through the access control apparatus.

For this purpose, the copy-over data carrier is read by a reading device on the access control apparatus. The reading device can be the non-contact-type access authorization reading device or a contact-type access authorization reading device on the access control apparatus, or else a separate copy-over reading device.

The copy-over data carrier can be a bar-code ticket or magnetic ticket or a contact-type ticket with a chip. In this case, the contact-type access authorization reading device, formed for example as an insert reader, can be used for reading the copy-over data carrier. If a non-contact-type data carrier, e.g. an RFID transponder, is used as the copy-over data carrier, the non-contact-type access authorization reading device disposed in the ground area can form the reading device for the copy-over data carrier.

The access authorization read from the copy-over data carrier by the reading device is coded contactlessly onto the data carrier in the ski, ski boot or similar object on the user near the ground. For this purpose, a separate coding device can be provided alongside the reading device, but the reading device is preferably formed as a combined reading and coding device.

The antenna of the coding device can be formed by the antenna to which the access authorization reading device of the access control apparatus is connected, which releases the access upon a valid reading of an access authorization. The access authorization reading device on the access control apparatus can be a combined reading and coding device. If the access authorization reading device is formed as a combined reading and coding device, the coding device for coding the access authorization data from the copy-over data carrier to the data carrier in the ski, ski boot or similar object near the ground can moreover be formed by said combined reading and coding device.

After the access authorization is coded onto the data carrier in the ski, ski boot or similar object, the coding authorization is deleted on the copy-over data carrier in order to prevent use of the copy-over data carrier for coding further data carriers.

Since the access control apparatus can be passed either with the skis strapped on or with the skis held and carried in one's hands, a further antenna is preferably provided above the ground for coding the data carrier in the ski with the access authorization when the access control apparatus is passed.

Said further antenna is preferably the antenna of the access authorization reading device which is provided for reading an access authorization stored in a data carrier which the users carry higher up, i.e. in or on the trousers, on the upper part of the body, on the arm or the headgear. The transaction range of said antenna thus generally extends from knee height up to the head, i.e. from about 50 cm to 2 m.

That is, according to the invention, a single combined reading and coding device can be provided which forms the access authorization reading device, the copy-over reading device and the coding device all at once. The combined reading and coding device is connected to the antenna in the ground area, preferably also to the antenna above the ground. Additionally, it can be connected to an insert reader if contact-type access authorization data carriers and/or copy-over data carriers are used.

Although both skis or ski boots are generally each provided with a data carrier, only the data carrier in one of the skis or ski boots is preferably coded with the access authorization, in order to avoid a duplication of access authorizations.

The inventive system is intended primarily for access control apparatuses at ski lifts and similar winter sports facilities, i.e. for data carriers provided for example in alpine skis, cross-country skis, snowboards, sleds and the like, or ski boots, snowboard boots and the like. However, other objects carried by a user near the ground can also be used for receiving the data carrier, for example ski poles, gym shoes and the like.

BRIEF DESCRIPTION OF THE DRAWING

Hereinafter an embodiment of the inventive apparatus will be explained more closely by way of example with reference to the enclosed drawing, whose single FIGURE schematically shows an access control apparatus for a winter sports facility.

DETAILED DESCRIPTION OF THE INVENTION

The access control apparatus 1 has an entrance lane 2 at which a reading and coding device 3 with an antenna 5 is disposed, which is located inside the housing 8 and therefore shown by dashed lines.

The reading and coding device 3 is connected to a evaluation unit (not shown) which drives a rotating barrier 6 which releases the access 2 when the reading and coding device 3 reads a valid access authorization from a contactless data carrier, for example an RFID transponder, which the user carries, e.g. in a breast pocket or, as shown, integrated in a wrist watch 4.

The housing (8) of the reading and coding device (3) contains, besides the electronics for the reading and coding device (3) and the evaluation unit, the gearing and motor for the rotating barrier (6) and further components for operating the access control apparatus (1).

The access control apparatus 1 can moreover be passed by a skier standing on skis 7 with a data carrier 9 storing an access authorization. For this purpose, a further antenna 11 likewise connected to the reading and coding device 3 is provided on the ground of the entrance lane 2.

While the data carrier 4 in the wrist watch can be coded without problems by a coding device at a ticket office upon acquisition of the access authorization, the coding of the data carrier 9 in the ski 7 at a ticket office involves problems.

According to the invention, a copy-over data carrier 12 is therefore provided, for example in the form of a card-shaped RFID transponder. The copy-over data carrier 12 can be coded by the coding device at the ticket office with a coding authorization for an access authorization. With the reading and coding device 3 the coding authorization on the copy-over data carrier 12 is read via the antenna 5, and the access authorization coded onto the data carrier 9 in the ski via the antenna 11, and then the coding authorization on the copy-over data carrier 12 deleted. Thus, the data carrier 9 in the ski 7 is provided with a valid access authorization, so that the reading and coding device 3 detects a valid access authorization via the antenna 11 and thus releases the rotating barrier 6 upon this access and, depending on the period of validity of the access authorization, upon subsequent accesses with the data carrier 9 in the ski 7.

The invention claimed is:

1. A system including an access control apparatus for controlling access of a person to an area, said access control apparatus having a non-contact-type access authorization reading device for reading an access authorization stored in a portable access authorization data carrier which is received by an object carried by the user near a ground area, the reading device having an antenna disposed in the ground area, and being connected to an evaluation unit which releases the access for a person upon reading of a valid access authorization, the system further including a portable copy-over data carrier on which a coding authorization and an access authorization are stored upon acquisition, a copy-over reading device for reading the coding authorization from the portable copy-over data carrier, and a coding device for coding the access authorization read from the copy-over data carrier onto the portable access authorization data carrier in response to the reading device reading the coding authorization from said portable copy-over data carrier, wherein the coding authorization on the portable copy-over data carrier is deleted after coding so that the copy-over data carrier is not capable of providing the access authorization to additional access authorization data carriers.

2. The system according to claim 1, wherein the copy-over reading device is provided on the access control apparatus.

3. The system according to claim 1, wherein the copyover reading device is formed by the non-contact-type access authorization reading device on the access control apparatus.

4. The system according to claim 1, wherein the coding device includes the antenna which is disposed in the ground area for coding the access authorization onto the portable access authorization data carrier.

5. The system according to claim 1, wherein the access authorization reading device on the access control apparatus has a further antenna disposed above the ground area.

6. The system according to claim 5, wherein the antenna disposed above the ground area forms a further antenna of the coding device.

7. The system according to claim 1, wherein the access authorization reading device, the copy-over reading device and the coding device are formed by a combined reading and coding device.

8. The system according to claim 1, wherein the object receiving the portable access authorization data carrier is a boot or a ski.

9. The system according to claim 1, wherein said portable copy-over data carrier comprises a contact-type ticket with a chip or a magnetic ticket.

10. A system for controlling access of a person to an area comprising:

a portable access authorization data carrier for mounting to an object for carrying by a user and for receiving and storing an access authorization;

an access control apparatus for controlling access of a person to an area comprising an access authorization reading device including an antenna disposed in a ground area for reading an access authorization from said portable access authorization data carrier;

an evaluation unit for evaluating the access authorization from the access authorization reading device to provide access for a person to the area when the access authorization is received;

a portable copy-over data carrier on which a coding authorization and an access authorization are stored upon acquisition;

a copy-over reading device for reading the coding authorization and the access authorization from the portable copy-over data carrier; and a coding device including the antenna of said access control apparatus for coding the access authorization received from the copy-over reading device onto the portable access authorization data carrier during a first pass of the portable access authorization data carrier through the ground area of the antenna, the coding device deleting the coding authorization in the portable copy-over data carrier after the copy-over reading device reads the coding authorization, wherein the access control apparatus repeatedly provides access for a person to the area in response to each subsequent detection of the access authorization stored on the portable access authorization data carrier.

11. The system of claim 10, wherein said portable copy-over data carrier comprises a contact-type ticket with a chip.

12. The system of claim 10, wherein said antenna is embedded in the ground, placed on the ground, or is provided on the underside of a mat.

13. The system of claim 10, wherein the access control device further comprises a singling device for controlling the access of a person to the area.

14. The system of claim 13, wherein said singling device comprises a rotating barrier or a light barrier.

15. A system for controlling access to an area comprising:

an access control device including a singling device;

a portable access authorization data carrier for mounting to an object for carrying by a user near the ground and for receiving and storing an access authorization;

a portable copyover data carrier separate from said portable access authorization data carrier, on which a coding authorization and an access authorization are stored upon acquisition; and a reading and coding device for 1) reading the coding authorization and the access authorization from the portable copy-over data carrier; 2) sending the access authorization read from the portable copy-over data carrier to said portable access authorization data carrier for storage therein; and 3) deleting the coding authorization on said portable copy-over data carrier, wherein said reading and coding device enables access through the singling device each time a valid access authorization from said portable access authorization data carrier is detected.

16. The system of claim 15, wherein said singling device comprises one of a rotating barrier and a light barrier.

17. The system of claim 16, including a copy-over data carrier coding device remote from said access control apparatus for providing the coding authorization for storage in said portable copy-over data carrier.

18. The system of claim 15, wherein said portable copy-over data carrier and said portable access authorization data carrier each comprise an RFID transponder.

19. The system of claim 14, including an antenna embedded in the ground, placed on the ground, or provided on an underside of a mat covering a passageway of the singling device.

20. A method for controlling access of a person to an area comprising:

providing a copy-over data carrier coding device;

storing a coding authorization and an access authorization in a portable copy-over data carrier with the copy-over data carrier coding device;

providing the portable copy-over data carrier and providing a portable access authorization data carrier to a person at a first location;

providing an access control apparatus having a non-contact-type access authorization reading device disposed at a second location a distance from the first location;

providing a copy-over reading device and an access authorization data carrier coding device at the second location;

reading the coding authorization from the portable copy-over data carrier with the copy-over reading device at the second location;

reading the access authorization from the portable copy-over data carrier with the copy-over reading device at the second location;

in response to the coding authorization as read by the copy-over reading device, coding the access authorization onto the portable access authorization data carrier with the access authorization data carrier coding device to store the access authorization in the portable access authorization data carrier;

deleting the coding authorization from the portable copy-over data carrier so that the portable copy-over data carrier is usable only once for providing the access authorization to the portable access authorization data carrier;

detecting a valid access authorization from the presence of the portable access authorization data carrier, with the non-contact type access authorization reading device; and repeatedly enabling access to the area for a person by operating the access control apparatus in response to the non-contact type access authorization reading device detecting a valid access authorization on the portable access authorization data carrier.

21. The method of claim 20, comprising:

providing the copy-over reading device, the non-contact-type access authorization reading device, and the access authorization data carrier coding device as a combined reading and coding device of the access control apparatus at the second location;

providing the non-contact-type access authorization reading device with a first antenna disposed in a ground area at the second location;

providing the access control apparatus with a second antenna disposed above the ground area at the second location; and providing the access control apparatus with a singling device at the second location, the singling device enabling access of a person into the area in response to the combined reading and coding device detecting a valid access authorization stored on the portable access authorization data carrier, wherein the first location comprises a ticket office.

* * * * *